United States Patent [19]

Nies et al.

[11] Patent Number: 4,886,319

[45] Date of Patent: Dec. 12, 1989

[54] LOW HYSTERESIS PROPORTIONER VALVE

[75] Inventors: David L. Nies, Dayton; Tomas L. Shroyer, Centerville, both of Ohio

[73] Assignee: General Motors Corporation, Detroit, Mich.

[21] Appl. No.: 277,804

[22] Filed: Nov. 30, 1988

[51] Int. Cl.⁴ .......................... B60T 13/00; B60T 8/26
[52] U.S. Cl. .................................. 303/9.75; 188/349; 303/68; 60/591
[58] Field of Search ............... 188/349, 195; 303/9.62, 303/9.63, 9.64, 9.66, 9.67, 9.68, 9.69, 9.71, 9.72, 9.73, 9.74, 9.75, 60, 22.1, 22.8, 24.1, 68; 60/195

[56] References Cited

U.S. PATENT DOCUMENTS

| | | | |
|---|---|---|---|
| 3,283,504 | 11/1966 | Stelzer | 303/9.73 |
| 3,315,469 | 4/1967 | Stelzer | 303/9.73 X |
| 3,423,936 | 1/1969 | Stelzer | 303/9.75 X |
| 3,489,465 | 1/1970 | Bueler | 303/9.67 |
| 3,623,776 | 11/1971 | Wellman | 188/349 X |
| 3,637,963 | 1/1972 | Wellman | 188/349 X |
| 3,695,730 | 10/1972 | Ayers, Jr. | 188/349 X |
| 3,721,473 | 3/1973 | Budzich | 303/9.72 |
| 4,203,628 | 5/1980 | Ohta et al. | 303/9.75 X |
| 4,316,639 | 2/1982 | Schäfer | 303/9.72 |
| 4,452,494 | 6/1984 | Kadota | 188/349 X |
| 4,466,671 | 8/1984 | Miyasaka | 303/9.73 |
| 4,475,339 | 10/1984 | Inoue | 188/349 X |
| 4,749,237 | 6/1988 | Kubota et al. | 303/9.62 |
| 4,809,505 | 3/1989 | Kamemoto et al. | 188/349 |

*Primary Examiner*—Douglas C. Butler
*Attorney, Agent, or Firm*—Ernest E. Helms

[57] ABSTRACT

The present invention provides an apparatus and method of utilization thereof of a vehicle brake master cylinder proportioning valve. The valve includes a valve body having a main bore fluidly connected with the master cylinder, primary and secondary circuits. A first housing fluidly seals the main bore into first and second chambers. A second housing fluidly separates the main bore second chamber from the secondary circuit. A valve piston spring biased away from the first chamber is mounted within a bore of the housing. The valve also has fluid communication between the second circuit and second chamber when the fluid pressure within the second circuit exceeds the fluid pressure within the second chamber. At an increase in master cylinder pressure past a first predetermined pressure the valve piston moves towards the first chamber, reaching a pressure balanced position metering pressurized fluid flow from the master cylinder to the second circuit. A lowering of the master cylinder pressure causes the piston to move towards the first chamber displacing fluid away from the second circuit and thereupon the valve piston is returned by the spring to a position furtherest away from the first chamber.

8 Claims, 2 Drawing Sheets

LOW HYSTERESIS PROPORTIONER VALVE

FIELD OF THE INVENTION

The field of the present invention is that of vehicle brake master cylinder proportioning valves. More particularly, the field of the present invention is that of two diameter vehicle master cylinder proportioning valves.

DISCLOSURE STATEMENT

Typically in lighter cars, especially front wheel drive vehicles, the master cylinder will deliver pressurized braking fluid at equal pressures to the front and rear brakes upon the initial stages of braking. As the braking force is increased for hard braking situations, it is often desirable that the fluid pressure delivered to the rear brakes be a proportion of the increase in pressure delivered to the front brakes. Referring additionally to FIGS. 1 and 2, to accomplish the above proportioning there is added to the braking circuit a proportioning valve 80. The proportioning valve will deliver fluid to the front and rear brakes of generally equal pressures up to a predetermined value commonly referred to as the knee 81. Thereupon the proportioning valve will meter flow to the rear brake to allow the rear brake to be applied only as a function of the increase in pressure delivered to the front brakes 82. Upon a release of the brake pedal 83, typically the pressure to the rear brake will remain constant. The pressure applied to the front brake will steadily decrease approximating the pressure within the master cylinder. After a delay the pressure applied to the rear brake will also diminish and will again, be equal with the pressure of the brake fluid delivered to the front brakes 84.

The above causes a hysteresis 85 in that upon the release of pressure by the master cylinder, (above the knee) the rear brakes will be retained at an elevated pressure for a delayed period of time 83. In the prior valve 80 the master cylinder 86 delivers fluid to a main bore 87 of the valve body. The valve body has a housing member 93 which seals a portion of the main bore and allows that portion of the main bore to be vented to the atmosphere. Slidably mounted within an axial bore of the housing is a valve piston 88 which is spring biased downward against a rubber valve seat 89 which is provided with clearance studs 90. During normal braking operation the fluid pressure force within the main bore will tend to push the valve piston 88 upward. However, the upward force is overcome by the downward spring force. Pressurized brake fluid will flow to the primary (front brake or brakes) circuit 91 and secondary (rear brake or brakes) circuit 92 at approximately the same pressure that exists within the master cylinder. (Note: the words primary and secondary as used in this application do not refer to the primary and secondary chambers of a dual chamber master cylinder.) Under increased pressures the valve piston 88 will move up against the force of the spring and will start metering brake fluid to the second circuit 92. (This action roughly occurs at the knee 81.) At this point the proportioning to the secondary fluid circuit will begin.

A force balance is achieved between the master cylinder pressure (multiplied by the valve stem cross-sectional area at the housing 93) and the pressure in the second circuit (multiplied by the valve stem cross sectional area at the rubber valve seat 89) versus the force of the spring and the master cylinder pressure (multiplied by the valve stem cross-sectional area at the rubber valve seat 89).

Upon a lowering of the master cylinder pressure by releasing the brake pedal, the pressure in the secondary circuit 92 will tend to hold the valve piston 88 upward thereby maintaining pressure in the secondary circuit 92 until such time that the pressure within the master cylinder 86 is so low that the spring overcomes the fluid force of the secondary circuit 92 causing the piston 88 to go down and open the secondary circuit 92 to the master cylinder 86. This freezing of the piston 88 upon the initial release of the pressure of the master cylinder causes the hysteresis 85 as illustrated in FIG. 2.

The above analysis ignores the hysteresis caused by friction and inertia forces of valve components which is low compared with the pressure and spring forces. However, friction and inertial forces also effect hysteresis 85.

SUMMARY OF THE INVENTION

To decrease the hysteresis experienced by prior proportioning valves the present invention is brought forth.

The present invention provides two diameter proportioning valves. The inventive proportioning valve lowers hysteresis by allowing displacement of fluid from the secondary circuit upon the initial lowering of pressure within the master cylinder. The valve then assumes a position to allow free flow between the master cylinder and secondary circuit.

It is an object of the present invention to provide an apparatus and a method of utilization thereof of a two diameter proportioning valve with lower hysteresis.

It is an object of the present invention to provide a two diameter vehicle brake master cylinder proportioning valve for supplying primary and secondary circuits with pressurized fluid from a master cylinder, the valve supplying both the circuits at generally the same pressure at lower fluid pressures and generally when the master cylinder pressure rises above a first predetermined pressure, the valve supplies fluid at an increased master cylinder pressure to the primary circuit and at a proportion of the increased master cylinder pressure to the second circuit, the valve including a valve body having a main bore with a primary axis, the valve body adjacent an end of the main bore being fluidly connected with the secondary circuit, the main bore also being fluidly connected with the master cylinder and the primary circuit axially spaced from the fluid connection of the main bore with the second circuit, first housing means fluidly sealing the main bore into first and second chambers, the first chamber being open to a vent and the second chamber being fluidly connected with the master cylinder and the primary circuit, the first housing means having a bore with a first diameter generally parallel with the main bore primary axis intersecting the first and second chambers, second housing means dividing the main bore second chamber from the secondary circuit connection with the main bore, the second housing having a bore at a second diameter differing from the first diameter generally axially aligned with the bore in the first housing means, means allowing fluid communication from the second circuit to the second chamber when the pressure within the second circuit exceeds the pressure within the second chamber, a valve piston spring biased away from the first chamber slidably and sealably mounted within the bore of the first housing means and slidably mounted in the bore of the second housing means whereby when the brake cylinder pressure is increasing from a low valve, the valve piston is held by the spring in an extreme position away from the first chamber and pressurized fluid freely flows between the master cylinder and the second circuit, and at an increase in master cylinder pressure past the first predetermined pressure, the valve piston moves towards the first chamber reaching a force balanced positioned metering pressurized fluid flowing from the master cylinder to the second circuit, and a lowering of the master cylinder pressure from a value above the first predetermined pressure causes the valve piston to move towards first chamber displacing fluid away from the second circuit and thereupon be returned by the spring to a position further away from the first chamber.

It is an object of the present invention to provide a two diameter vehicle brake master cylinder proportioning valve for supplying primary and secondary circuits with pressurized fluid from a master cylinder, the valve supplying both circuits at generally the same pressure at lower fluid pressures and generally when the master cylinder pressure rises above a first predetermined pressure the valve supplies fluid at an increase master cylinder pressure to the primary circuit at the increase master cylinder pressure and at a portion of the increase master cylinder pressure to the second circuit, the valve including a valve body having a main bore with a primary axis, the valve body adjacent at end of the main bore being fluidly connected with the secondary circuit, the main bore also being fluidly connected with the master cylinder and the primary circuit axially spaced from the fluid connection of the second circuit with the main bore, a valve housing fluidly sealing the main bore into first, second and third chambers, the first chamber being open to a vent and the second chamber being fluidly connected with the master cylinder and the primary circuit, and the third chamber being towards the main bore connection with the second circuit, the housing having a multi-diameter bore with a first diameter intersecting the first and second chambers and a second diameter intersecting the second and third chambers, and the third chamber being towards the end of the main bore wherein the second circuit connects with the main bore and the third chamber of the housing having a seat for an inserted sealing ring axially aligned with the multi-diameter bore of the housing and the third chamber having a section with a diameter greater than the diameter of the sealing ring, and a valve piston biased by a spring away from the first chamber slidably mounted within the housing bore and sealably mounted between the first and second chambers and the valve piston having an internal bore connecting the second chamber with the second circuit, and the valve piston having check valve means allowing fluid communication from the second circuit towards the second chamber, whereby when the brake cylinder pressure is increasing from a lower value the valve piston is held by the spring underneath a median position with the seal ring whereby fluid freely flows between the master cylinder and the connection of the secondary circuit with the main bore and at an increase of pressure in the master cylinder above the first predetermined pressure, the valve piston moves towards the first chamber reaching a pressure balance position adjacent to the first sealing ring metering pressurized fluid flowing from the second chamber to the second circuit and whereupon a lowering of the master cylinder pressure from a value above the predetermined pressure, the valve piston moves toward the first chamber displacing fluid away from the second circuit and thereupon is returned by the spring to a position furtherest away from the first chamber.

It is an object of the present invention to provide a method of proportioning pressurized fluid from a brake master cylinder to a primary and secondary fluid circuits where the master cylinder at generally low pressures supplies pressurized fluid at the same pressure to the first and second fluid circuits and when the master cylinder pressure increases beyond a predetermined pressure the master cylinder supplies pressurized fluid to the first fluid circuit at generally the same pressure of the master cylinder and supplies pressurized fluid to the second fluid circuit at a proportion of the increase of the pressure of the master cylinder, the method including fluidly connecting a valve body having a main bore along a primary axis with the master cylinder, fluidly connecting the main bore adjacent to an end of the main bore with the secondary circuit, and fluidly connecting the main bore with the primary circuit axially spaced from the secondary circuit, sealably separating the main bore into first and second chambers with a first housing means having a bore with a first diameter generally parallel with the primary axis of the main bore, the first chamber being open to the atmosphere and the second chamber being fluidly connected with the master cylinder and the primary circuit, sealably separating the second chamber from the fluid connection of the main bore with the secondary circuit with a second housing means having a second bore axially aligned with the bore of the first housing means with a different diameter, fluidly communicating from the second circuit to the second chamber when the pressure within the second circuit is greater than the pressure within the second chamber, and slidably mounting within the bores of the first and second housing means a piston valve which is sealably mounted within the first housing means bore and is spring biased away from the first chamber whereby when the brake cylinder pressure is increasing from a low value the valve piston is held by the spring away from the first chamber and pressurized fluid freely flows from the master cylinder to the secondary circuit and an increase in the master cylinder pressure beyond a first predetermined pressure causes the valve piston to move towards the first chamber reaching a force balance position metering pressurized fluid from the master cylinder to the second circuit and whereupon a lowering of the master cylinder pressure from a value above the predetermined pressure causes the valve piston to move towards the first chamber displacing fluid away from the second circuit and thereupon be returned by the spring to a position furtherest away from the first chamber.

Further objects, desires and advantages of the present invention can become more apparent to those skilled in the art as the nature of the invention is better understood from the accompanying drawings and a detailed description.

DETAILED DESCRIPTION OF THE DRAWINGS

Figure 1:
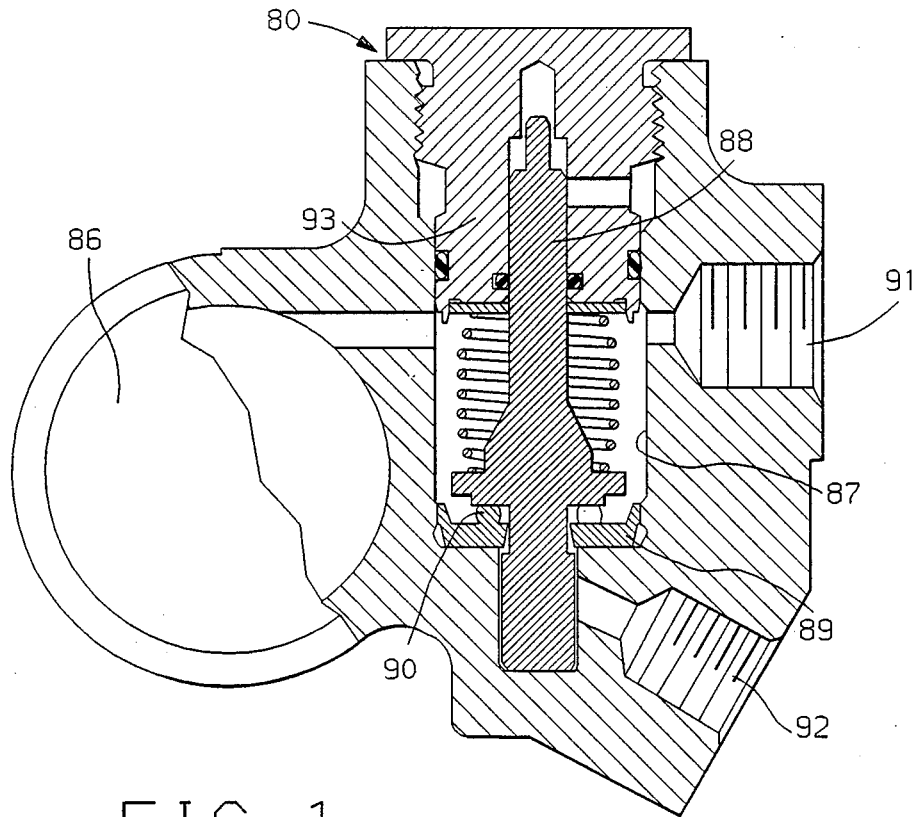
FIG. 1 is a sectional view of a previous proportioning valve.
Figure 2:
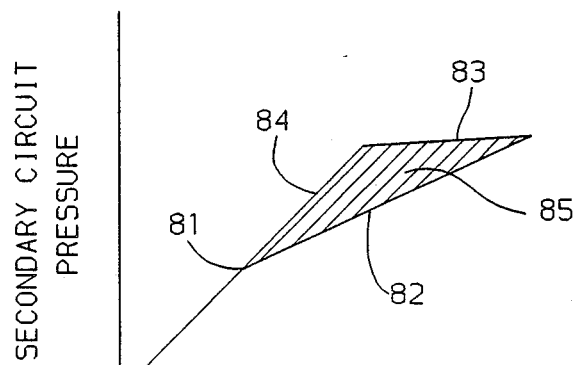
FIG. 2 is a primary and secondary circuit pressure graph illustrating the pressure characteristic of the proportioning valve illustrated in FIG. 1.
Figure 3:
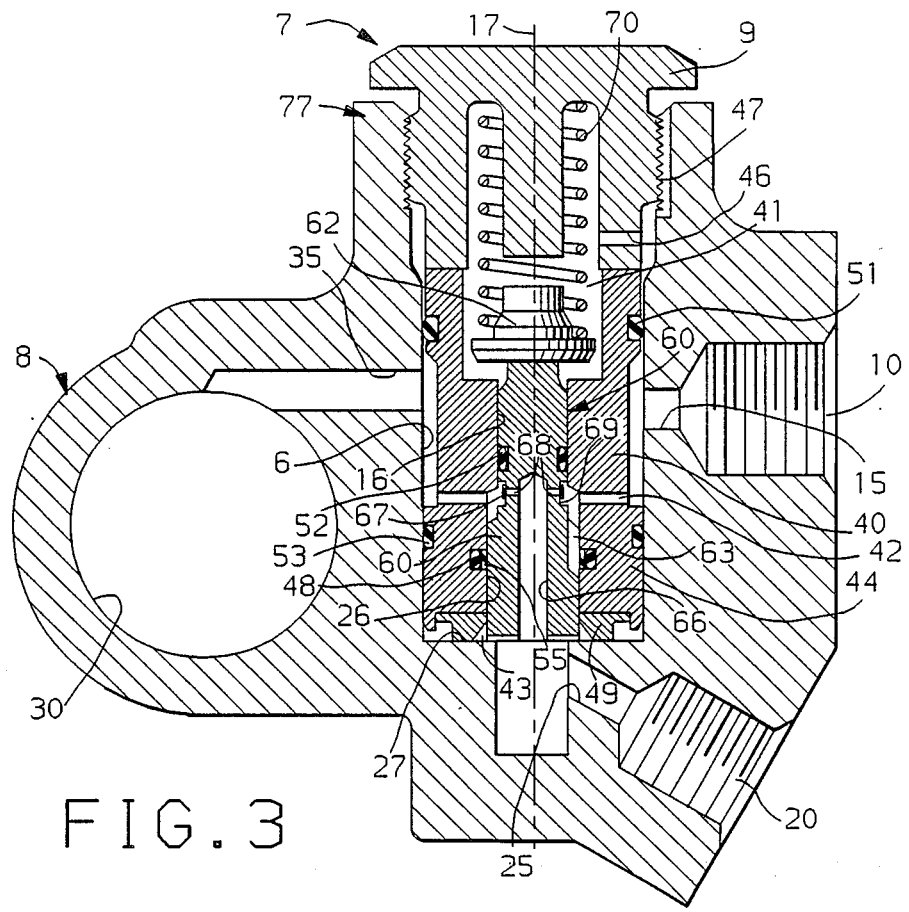
FIG. 3 is a sectional view of a preferred embodiment proportioning valve according to the present invention.
Figure 4:
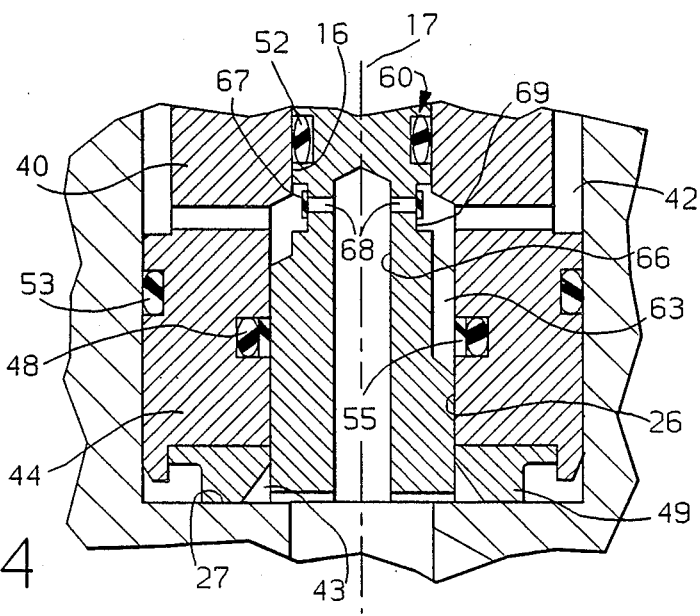
FIG. 4 is an enlarged view of the proportioning valve shown in FIG. 3.

Referring to FIGS. 3 and 4 the master cylinder proportioning valve 77 has a body integrally joined to the casting of the master cylinder 8. Fluid is supplied from a bore 30 of the master cylinder to a primary brake circuit 10 and a secondary brake circuit 20.

The valve 7 body has a main bore 6 with a primary axis 17. The main bore 6 has connections 35, 25 and 15 with the master cylinder bore 30, secondary circuit 20 and primary circuit 10 respectively. Within the main bore 6 is a primary housing means 40 which divides the bore into a first chamber 41 above and a second chamber 42 below.

The first chamber 41 has threadably inserted thereto a cap 9. The first chamber is vented to the atmosphere via a bore 46 and a slot 47 in the valve body 77. The first housing 40 has a bore 16 generally parallel with the primary axis 17. The second chamber 42 is fluidly connected with the connections 35 and 15 of the main bore. Below the primary housing 40 and integrally joined thereto is a second housing means 44 which separates the second chamber 42 from the lower third chamber 43. The third chamber 43 is fluidly connected with the secondary circuit 20.

The second housing 44 has a second bore 26 aligned with the first bore 16. The second bore 26 has a diameter differing (usually larger) from the first bore 16. The second housing 44 is configured to provide the third chamber 43 with a diameter greater than that of the second bore 26.

Sealing connections 25 and 15 are O-rings 51 and 53 which also maintain the sealing between the second chamber 42 and the first 41 and third 43 chambers. An insert 49 positionally mounts the second housing means 44 within the main bore 6 allowing the third chambers 43 to have a larger diameter than the second bore 26.

A valve piston 60 is slidably mounted in the first 16 and second 26 bores. An 0-ring 52 seals the piston 60 between the first and second chambers. The piston 60 is biased by a spring 70 away from the first chamber 41 and pushes against a spring retainer 62. The spring 70 is mounted by the end cap 9 which also positions the integral first 40 and second 44 housing within the main bore 6.

Piston 60 has an internal bore 66 which branches off into radial passages 68. Radial passages 68 intersect radial indention 69 which is covered by elastic band 67. The above-described elements provides a means of fluid communication from the second circuit 20 to the second chamber 42. Elastic band 67 provides means of a check valve to allow fluid communication only when the fluid pressure within the second circuit 20 is greater than the pressure within second chamber 42.

In the initial position the piston 60 is in an extreme position away from the first chamber 41 resting against a stop 27. When the brakes are applied, fluid pressure increase in the bore 30 fluid flows from the master cylinder through second chamber 42 to primary circuit 10. Fluid also flows down into bore 26 past a slot 63 in the piston 60 into the third chamber 43 (via the clearance between the outer diameter of the piston 60 and the second bore 26). At this point fluid is delivered to the first 10 and second 20 circuits generally at the same pressure.

As the master cylinder pressure surpasses the first determined value (or knee) the piston 60 assumes a median metering position which places the bottom of slot 63 adjacent to a Teflon polytetrafluoroethylene sealing ring 55 which is usually located in the smallest diameter portion of third chamber 43. When piston 60 is metering fluid flow to the secondary circuit 20, a force balance is established. Urging the piston 60 downward is the force of spring 70 and the force of the fluid pressure of the second chamber 42 (multiplied by the cross-sectional area of second bore 26). Urging the piston 60 upward is the force of the fluid pressure of second chamber 42 (multiplied by the cross-sectional area of first bore 16) and the force of the fluid pressure of the second circuit 20 (multiplied by the cross-sectional area of the second bore 26).

In the metering position the increase in the master cylinder pressure above the knee is proportionately delivered to secondary circuit 20 by upward and downward movement of piston 60. The use of a Teflon polytetrafluoroethylene seal ring 55 prevents excessive wear on O-ring 48. When piston 60 is in a position to allow metering fluid flow, fluid will flow past the seal ring 55 along the clearance between piston 60 and second bore 26. An optional slot (not shown) can be added in end piece 49 to aid flow if desired. When the brake pedal is released fluid rapidly diminishes within the bore 30 of the master cylinder below the value of the knee. The pressure within second chamber 42 rapidly diminishes. The above provides a force imbalance which pushes piston 60 upwards thereby displacing fluid from the secondary circuit 20. The removal of fluid from the second circuit allows the pressure in the second circuit 20 to rapidly diminish minimizing any hysteresis.

Since the second chamber 42 fluid pressure is now lower than the fluid pressure in the second circuit fluid will flow through bore 66 out radial passages 68 past elastic band 67 further reducing the fluid pressure within second chamber 20.

As the pressure within second chamber 42 further diminishes to a value more close to that of first chamber 41 (atmospheric) the upward pressure force of the second chamber 42 on the piston 60 cross section (diameter at first bore 16) will cancel out. The force of spring 70 will overcome the lowered pressure force of the secondary circuit 20, and the piston value 60 will again return back to stop 27.

The present invention provides a method of proportioning pressurized fluid from a brake master cylinder 30 to a primary 10 and secondary 20 fluid circuits where the master cylinder 30 at generally low pressures supplies pressurized fluid at the same pressure to the first and second fluid circuits and when the master cylinder pressure increases beyond a predetermined pressure the master cylinder 30 supplies pressurized fluid to the first fluid circuit 10 a generally the same pressure of the master cylinder 30 and supplies pressurized fluid to the second 20 fluid circuit at a proportion of the increase of the pressure of the master cylinder 30, the method including the following steps:

1. Fluidly connecting a valve body 7 having a main bore 6 along a primary axis 17 with the master cylinder 30, fluidly connecting the main bore 6 adjacent to an end of the main bore with the secondary circuit 20, and fluidly connecting the main bore 6 with the primary circuit 10 axially spaced from the secondary circuit 20;

2. Sealably separating the main bore 6 into first 41 and second 42 chambers with a first housing means 40 having bore 16 with a first diameter generally parallel with the primary axis of the main bore 6, the first chamber 41 being open to the atmosphere and the second chamber 42 being fluidly connected with the master cylinder 30 and the primary circuit 10;

3. Sealably separating the second chamber 42 from the fluid connection of the main bore 6 with the secondary circuit 20 with a second housing means 44 having a second bore 26 axially aligned with the bore of the first housing means with a different diameter;

4. Fluidly communicating from the second circuit 10 to the second chamber 42 when the pressure within the second circuit 20 is greater than the pressure within the second chamber 42; and 5. Slidably mounting within the bores of the first and second housing means a valve piston 60 which is sealably mounted within the first housing means bore and spring 70 is biased away from the first chamber 41 whereby when the brake cylinder 30 pressure is increasing from a low value the valve piston 60 is held by the spring 70 away from the first chamber 41 and pressurized fluid freely flows from the master cylinder 30 to the secondary circuit 20 and an increase in the master cylinder 30 pressure beyond a first predetermined pressure causes the valve piston 60 to move towards the first chamber 41 reaching a force balance position metering pressurized fluid from the master cylinder 30 to the second circuit 20 and whereupon a lowering of the master cylinder 30 pressure from a value above the predetermined pressure causes the valve piston 60 to move towards the first chamber 41 displacing fluid away from the second circuit 20 and thereupon be returned by the spring 70 to a position furtherest away from the first chamber 41.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A two diameter vehicle brake master cylinder proportioning valve for supplying primary and secondary circuits with pressurized fluid from a master cylinder, said valve supplying both said circuits at generally the same pressure at lower fluid pressures and generally when said master cylinder pressure rises above a first predetermined pressure, said valve supplies fluid at an increased master cylinder pressure to said primary circuit and at a proportion of said increased master cylinder pressure to said secondary circuit, said valve in combination comprising:

a valve body having a main bore with a primary axis, said valve body adjacent an end of said main bore being fluidly connected with said secondary circuit, said main bore also being fluidly connected with said master cylinder and said primary circuit axially spaced from said fluid connection of said main bore with said secondary circuit;

first housing means fluidly sealing said main bore into first and second chambers, said first chamber being open to a vent and said second chamber being fluidly connected with said master cylinder and said primary circuit, said first housing means having a bore with a first diameter generally parallel with said main bore primary axis intersecting said first and second chambers;

second housing means dividing said main bore second chamber from said secondary circuit connection with said main bore, said second housing having a bore at a second diameter differing from said first diameter generally axially aligned with said bore in said first housing means;

means allowing fluid communication from said secondary circuit to said second chamber when the pressure within said secondary circuit exceeds the pressure within said second chamber;

a valve piston spring biased away from said first chamber slidably and sealably mounted within said bore of said first housing means and slidably mounted in said bore of said second housing means whereby when said brake cylinder pressure is increasing from a low value, said valve piston is held by said spring in an extreme position away from said first chamber and pressurized fluid freely slows between said master cylinder and said secondary circuit, and at an increase in master cylinder pressure past said first predetermined pressure, said valve piston moves towards said first chamber reaching a force balanced position metering pressurized fluid flowing from said master cylinder to said secondary circuit, and a lowering of said master cylinder pressure from a value above said first predetermined pressure causes said valve piston to move towards first chamber displacing fluid away from said secondary circuit and thereupon be returned by said spring to a position further away from said first chamber.

2. A proportioning valve as described in claim 1 wherein said first and second housing means are integrally joined to one another.

3. A proportioning valve as described in claim 1 wherein said metering is accomplished by movement of said valve piston along a cylindrical seal ring axially aligned with said second bore.

4. A proportioning valve as described in claim 3 wherein said seal ring is fabricated from a polytetrafluoroethylene material.

5. A proportioning valve as described in claim 3 having a cavity under said seal ring with a diameter greater than said seal ring.

6. A proportioning valve as described in claim 1 wherein said fluid communication means is a bore in said valve piston connecting said secondary circuit with said second chamber with a check valve means preventing flow towards said secondary circuit.

7. A two diameter vehicle brake master cylinder proportioning valve for supplying primary and secondary circuits with pressurized fluid from a master cylinder, said valve supplying both circuits at generally the same pressure at lower fluid pressures and generally when said master cylinder pressure rises above a first predetermined pressure said valve supplies fluid at an increase master cylinder pressure to said primary circuit at said increase master cylinder pressure and at a portion of said increase master cylinder pressure to said secondary circuit, said valve in combination comprising:

a valve body having a main bore with a primary axis, said valve body adjacent at end of said main bore being fluidly connected with said secondary circuit, said main bore also being fluidly connected with said master cylinder and said primary circuit axially spaced from said fluid connection of said secondary circuit with said main bore;

a valve housing fluidly sealing said main bore into first, second and third chambers, said first chamber being open to a vent and said second chamber being fluidly connected with said master cylinder and said primary circuit, and said third chamber being towards said main bore connection with said secondary circuit, said housing having a multi-diameter bore with a first diameter intersecting said first and second chambers and a second diameter intersecting said second and third chambers, and said third chamber being towards said end of said main bore wherein said secondary circuit connectors with said main bore and said third chamber of said housing having a seat for an inserted sealing ring axially aligned with said multi-diameter bore of said housing and said third chamber having a section with a diameter greater than the diameter of said sealing ring; and a valve piston biased by a spring away from said first chamber slidably mounted within said housing bore and sealably mounted between said first and second chambers and said valve piston having an internal bore connecting said second chamber with said secondary circuit, and said valve piston having check valve means allowing fluid communication from said secondary circuit towards said second chamber, whereby when said brake cylinder pressure is increasing from a lower value said valve piston is held by said spring underneath a median position wiht said seal ring whereby fluid freely flows between said master cylinder and said connection of said secondary circuit with said main bore and at an increase of pressure in said master cylinder above said first predetermined pressure, said valve piston moves towards said first chamber reaching a pressure balance position adjacent to said first sealing ring metering pressurized fluid flowing from said second chamber to said secondary circuit and whereupon a lowering of said master cylinder pressure from a value above said predetermined pressure, said valve piston moves toward said first chamber displacing fluid away from said secondary circuit and thereupon is returned by said spring to a position furtherest away from said first chamber.

8. A method of proportioning pressurized fluid from a brake master cylinder to a primary and secondary fluid circuits where said master cylinder at generally low pressures supplies pressurized fluid at the same pressure to said primary and secondary fluid circuits and when said master cylinder pressure increases beyond a predetermined pressure said master cylinder siupplies pressurized fluid to said primary fluid circuit at generally the same pressure of said master cylinder and supplies pressurized fluid to said secondary fluid circuit at a proportion of the increase of the pressure of the master cylinder, said method in combination comprising:

fluidly connecting a valve body having a main bore along a primary axis with said master cylinder, fluidly connecting said main bore adjacent to an end of said main bore with said secondary circuit, and fluidly connecting said main bore with said primary circuit axially spaced from said secondary circuit;

sealably separating said main bore into first and second chambers with a first housing means having a bore with a first diameter generally parallel with said primary axis of said main bore, said first chamber being open to the atmosphere and said second chamber being fluidly connected with said master cylinder and said primary circuit;

sealably separating said second chamber from said fluid connecting of said main bore with said secondary circuit with a second housing means having a second bore axially aligned with said bore of the first housing means with a different diameter;

fluidly communicating from said secondary circuit to said second chamber when the pressure within said secondary circuit is greater than the pressure within said second chamber; and slidably mounting within said bores of said first and second housing means a piston valve which is sealably mounted within said first housing means bore and is spring biased away from said first chamber whereby when said brake cylinder pressure is increasing from a low value said valve piston is held by said spring away from said first chamber and pressurized fluid freely flows from said master cylinder to said secondary circuit and an increase in said master cylinder pressure beyond a first predetermined pressure causes said valve piston to move towards said first chamber reaching a force balance position metering pressurized fluid from said master cylinder to said secondary circuit and whereupon a lowering of said master cylinder pressure from a value above said predetermined pressure causes said valve piston to move towards said first chamber displacing fluid away from said second circuit and thereupon be returned by said spring to a position furtherest away from said first chamber.

* * * * *